(12) United States Patent
Baum et al.

(10) Patent No.: US 11,116,217 B2
(45) Date of Patent: Sep. 14, 2021

(54) SYNERGISTIC BIOCIDAL COMPOSITIONS CONTAINING 5-CHLORO-2-METHYLISOTHIAZOLIN-3-ONE

(71) Applicant: Thor GmbH, Speyer (DE)

(72) Inventors: Rüdiger Baum, Neulussheim (DE); Thomas Wunder, Neustadt a.d. Weinstrasse (DE); Hans-Jürgen Schmidt, Speyer (DE)

(73) Assignee: Thor GmbH, Speyer (DE)

( * ) Notice: Subject to any disclaimer, the term of this patent is extended or adjusted under 35 U.S.C. 154(b) by 57 days.

(21) Appl. No.: 16/091,075

(22) PCT Filed: Mar. 29, 2017

(86) PCT No.: PCT/EP2017/000380
§ 371 (c)(1),
(2) Date: Oct. 3, 2018

(87) PCT Pub. No.: WO2017/174180
PCT Pub. Date: Oct. 12, 2017

(65) Prior Publication Data
US 2019/0110477 A1 Apr. 18, 2019

(30) Foreign Application Priority Data
Apr. 5, 2016 (EP) ..................................... 16000775

(51) Int. Cl.
| *A01N 43/80* | (2006.01) |
| *A01N 33/20* | (2006.01) |
| *A01N 59/16* | (2006.01) |

(52) U.S. Cl.
CPC ............ *A01N 43/80* (2013.01); *A01N 33/20* (2013.01); *A01N 59/16* (2013.01)

(58) Field of Classification Search
None
See application file for complete search history.

(56) References Cited

U.S. PATENT DOCUMENTS

| 4,732,905 A | 3/1988 | Donofrio et al. |
| 5,591,759 A * | 1/1997 | Ito ........................ A01N 25/22 |
| | | 106/18.32 |
| 2006/0127272 A1 | 6/2006 | Saitmacher et al. |
| 2008/0009532 A1 * | 1/2008 | Wachtler ................ A01N 43/80 |
| | | 514/373 |
| 2017/0233585 A1 * | 8/2017 | Hahn ...................... C09D 5/025 |
| | | 424/618 |

FOREIGN PATENT DOCUMENTS

| EP | 0676140 B1 | 9/1999 | | |
| EP | 1005271 B1 | 11/2002 | | |
| EP | 1030558 B1 | 12/2002 | | |
| JP | H08231316 A | 9/1996 | | |
| JP | 2009067791 A | 4/2009 | | |
| JP | 4621829 B2 * | 1/2011 | | |
| JP | 4621829 B2 | 1/2011 | | |
| WO | WO-9201380 A1 * | 2/1992 | ............. A01N 47/44 |
| WO | WO 1992001380 A1 | 2/1992 | | |
| WO | WO-2016034266 A1 * | 3/2016 | ............. A01N 43/80 |
| WO | WO 2016034266 A1 | 3/2016 | | |

OTHER PUBLICATIONS

Collier, Journal of Applied Bacteriology, 69, 1990 (Year: 1990).*
F.C. Kull et al., "Mixtures of Quaternary Ammonium Compounds and Long-Chain Fatty Acids as Antifungal Agents," Applied Microbiology, vol. 9, 1961, p. 538. 4 pages.
Translation of the International Search Report dated May 16, 2017 in PCT/EP2017/000380. 3 pages.
EP 16000775.3, Apr. 5, 2016, EP 3439476.
PCT/EP2017/000380, Mar. 29, 2017, WO 2017/174180.

* cited by examiner

*Primary Examiner* — Susan T Tran
*Assistant Examiner* — William Craigo
(74) *Attorney, Agent, or Firm* — McCarter & English, LLP

(57) ABSTRACT

The invention relates to a biocidal composition containing 5-chlorine-2-methylisothiazolin-3-one and at least one other component selected from the group consisting of 1,2-benzisothiazolin-3-one, 2-bromine-2-nitropropane-1,3-diol and zinc. The claimed biocidal composition is characterized in that it contains methyl-4-isothiazolin-3-one in the region of between 0-2 wt. %, in relation to the total proportion of 5-chlorine-2-methyl-4-isothiazolin-3-ones. The invention also relates to the use of the claimed biocidal compositions for conserving technical products.

10 Claims, No Drawings

SYNERGISTIC BIOCIDAL COMPOSITIONS CONTAINING 5-CHLORO-2-METHYLISOTHIAZOLIN-3-ONE

CROSS-REFERENCE TO RELATED APPLICATION

This application is a 35 U.S.C. § 371 National Stage filing of International Application No. PCT/EP2017/000380, filed on Mar. 29, 2017, which claims priority to European Patent Application No. 16000775.3 filed Apr. 5, 2016.

The present invention relates to a biocidal composition which contains 5-chloro-2-methylisothiazolin-3-one as well as at least one further component selected from the group of 1,2-benzisothiazolin-3-one, 2-bromo-2-nitropropane-1,3-diol and zinc. The biocidal composition according to the invention is characterized in that it contains methyl-4-isothiazolin-3-one in the range of 0 to 2 wt. %, in relation to the total proportion of 5-chloro-2-methyl-4-isothiazolin-3-one. The invention also relates to the use of the biocidal compositions according to the invention for the preservation of technical products.

Technical products, especially aqueous products, such as paints, varnishes, emulsions and cosmetic products, are typically produced by using natural or biodegradable raw materials. These raw materials and the water used as solvent are often laden with germs, such as bacteria, yeasts and fungi. If one refrains from a preservation during the making of these products, even one day after production they may contain large germ counts.

In order to make sure that these products meet the hygiene requirements, thereby ensuring the shelf life of the technical products, so-called biocides are added to the products. One of these biocides is 5-chloro-2-methylisothiazolin-3-one (CMIT). This has a broad biocidal effect, but also various drawbacks in its practical handling. For example, this compound may trigger allergies in the persons handling it.

In order to overcome the drawbacks of this extremely effective CMIT, yet also having drawbacks for the end users, a search was undertaken in the 1990s for alternative biocides or biocidal compositions, the active ingredients of which interact synergistically and can be used in lesser concentrations when employed at the same time, as compared to the concentrations needed in the case of the individual components.

Thus, the synergistic mixture disclosed in EP 1 005 271 B1 of the isothiazolinones 2-methylisothiazolin-3-one (MIT) and 1,2-benzisothiazolin-3-one (BIT) has been used as a biocidal composition, since the early 1990s. This mixture is marketed by Thor GmbH (Speyer, Federal Republic of Germany) under the name Acticide MBS, it is free of 5-chlor-2-methylisothiazolin-3-one, and at present represents the standard for canning preservation of water-based paints and plasters.

Moreover, the European patent application EP 0 676 140 discloses, for example, a synergistic biocidal composition which contains 2-methylisothiazolin-3-one and 2-n-octylisothiazolin-3-one as a replacement for 5-chloro-2-methylisothiazolin-3-one.

Likewise, EP-B 1 030 558 discloses a synergistic biocidal composition which contains 2-methylisothiazolin-3-one and 3-iodo-2-propinyl-N-butylcarbamate. This synergistic composition is suitable for control of microorganisms even at low concentrations.

Starting with the above discussed prior art, there is a demand for further biocidal compositions, the components of which work together synergistically and therefore can be used in lesser concentrations when employed together, as compared to the concentrations needed in the case of the individual components.

This problem is solved by the invention by means of a biocidal composition containing 5-chloro-2-methylisothiazolin-3-one as well as at least one further component selected from the group of 1,2-benzisothiazolin-3-one, 2-bromo-2-nitropropane-1,3-diol and zinc. The biocidal composition according to the invention is characterized in that it contains methyl-4-isothiazolin-3-one in the range of 0 to 2 wt. %, in relation to the total proportion of 5-chloro-2-methyl-4-isothiazolin-3-one.

The biocidal composition according to the invention has the benefit that the 5-chloro-2-methylisothiazolin-3-one and the at least one component from the above indicated group work together synergistically and therefore can be used in low concentrations when employed at the same time, as compared to low concentrations in the case of the individual components.

The present invention furthermore makes it possible, by using the extremely effective 5-chloro-2-methylisothiazolin-3-one, which is free or almost free of 2-methylisothiazolin-3-one, to preserve products and to treat them in a way prior to marketing so that 5-chloro-2-methylisothiazolin-3-one is no longer present in the end product so that the allergy risk to the end user from these products is significantly reduced.

The biocidal composition according to the invention is generally characterized in that it contains methyl-4-isothiazolin-3-one in the range of 0 to 2 wt. %, in relation to the total proportion of 5-chloro-2-methyl-4-isothiazolin-3-one. According to one preferred embodiment of the invention, the biocidal composition is characterized in that it contains methyl-4-isothiazolin-3-one in the range of 0 to 1 wt. %, in relation to the total proportion of 5-chloro-2-methyl-4-isothiazolin-3-one. According to one especially preferred embodiment, the biocidal composition is characterized in that it contains methyl-4-isothiazolin-3-one in the range of 0 to 0.5 wt. %, in relation to the total proportion of 5-chloro-2-methyl-4-isothiazolin-3-one.

"At least one" means, in the context of the present invention, that the biocidal composition contains a single further component or compound, or several, i.e., two or three components or compounds from the respective group.

According to one preferred embodiment, the present invention relates to a biocidal composition which contains 5-chloro-2-methylisothiazolin-3-one and at least one further component. The biocidal composition is characterized in that it contains methyl-4-isothiazolin-3-one in the range of 0 to 2 wt. %, in relation to the total proportion of 5-chloro-2-methyl-4-isothiazolin-3-one. The biocidal composition is furthermore characterized
in that the weight ratio of 5-chloro-2-methylisothiazolin-3-one to 1,2-benzisothiazolin-3-one lies in the range of 1:2.5 to 1:300,
in that the weight ratio of 5-chloro-2-methylisothiazolin-3-one to 2-bromo-2-nitropropane-1,3-diol lies in the range of 1:2 to 1:40 and
in that the weight ratio of 5-chloro-2-methylisothiazolin-3-one to zinc lies in the range of 1:6 to 1:576.

Synergistic Biocidal Composition Containing 5-chloro-2-methylisothiazolin-3-one and 1,2-benzisothiazolin-3-one (BIT)

According to one embodiment, the invention relates to a biocidal composition containing 5-chloro-2-methylisothiazolin-3-one as well as 1,2-benzisothiazolin-3-one (BIT).

The biocidal composition according to the invention is characterized in that it contains methyl-4-isothiazolin-3-one in the range of 0 to 2 wt. %, in relation to the total proportion of 5-chloro-2-methyl-4-isothiazolin-3-one.

According to one preferred embodiment, the invention relates to a biocidal composition containing 5-chloro-2-methylisothiazolin-3-one as well as 1,2-benzisothiazolin-3-one, in a weight ratio of 5-chloro-2-methylisothiazolin-3-one to 1,2-benzisothiazolin-3-one generally in the range of 1:2.5 to 1:300, preferably in the range of 1:2.5 to 1:100, especially preferred in the range of 1:2.5-1:50. The biocidal composition according to the invention is characterized in that it contains methyl-4-isothiazolin-3-one in the range of 0 to 2 wt. %, in relation to the total proportion of 5-chloro-2-methyl-4-isothiazolin-3-one.

Synergistic Biocidal Composition Containing 5-chloro-2-methylisothiazolin-3-one and 2-bromo-2-nitropropane-1,3-diol (Bronopol)

According to one embodiment, the invention relates to a biocidal composition containing 5-chloro-2-methylisothiazolin-3-one as well as 2-bromo-2-nitropropane-1,3-diol (Bronopol). The biocidal composition according to the invention is characterized in that it contains methyl-4-isothiazolin-3-one in the range of 0 to 2 wt. %, in relation to the total proportion of 5-chloro-2-methyl-4-isothiazolin-3-one.

According to one preferred embodiment, the invention relates to a biocidal composition containing 5-chloro-2-methylisothiazolin-3-one as well as 2-bromo-2-nitropropane-1,3-diol in a weight ratio of 5-chloro-2-methylisothiazolin-3-one to 2-bromo-2-nitropropane-1,3-diol generally in the range of 1:2 to 1:40, preferably in the range of 1:2 to 1:30, especially preferred in the range of 1:5 to 1:30. The biocidal composition according to the invention is characterized in that it contains methyl-4-isothiazolin-3-one in the range of 0 to 2 wt. %, in relation to the total proportion of 5-chloro-2-methyl-4-isothiazolin-3-one.

Synergistic Biocidal Composition Containing 5-chloro-2-methylisothiazolin-3-one and zinc According to one embodiment, the invention relates to a biocidal composition containing 5-chloro-2-methylisothiazolin-3-one as well as zinc. The biocidal composition according to the invention is characterized in that it contains methyl-4-isothiazolin-3-one in the range of 0 to 2 wt. %, in relation to the total proportion of 5-chloro-2-methyl-4-isothiazolin-3-one. Namely, in the context of the invention is has been shown that the effect of 5-chloro-2-methyl-4-isothiazolin-3-one is surprisingly synergistically strengthened in the presence of zinc.

In the context of the present invention, the zinc is provided by at least one zinc compound serving as the zinc source. The zinc compound is preferably selected from the group consisting of zinc oxide, zinc chloride, zinc sulfate, zinc phosphate, zinc carbonate, zinc ascorbate, zinc dehydracetate, zinc hydroxide and zinc carboxylate. According to one preferred embodiment of the invention, the zinc compound is selected from the group consisting of zinc oxide, zinc chloride and zinc carbonate.

According to one preferred embodiment, the invention relates to a biocidal composition containing 5-chloro-2-methylisothiazolin-3-one as well as zinc in a weight ratio of 5-chloro-2-methylisothiazolin-3-one to zinc generally in the range of 1:6 to 1:576, preferably in the range of 1:6 to 1:250, especially preferred in the range of 1:6 to 1:125. The above indicated zinc compound(s) is/are present in such a quantity so that the above defined ratio between 5-chloro-2-methylisothiazolin-3-one and zinc results in the biocidal composition. The biocidal composition according to the invention is moreover characterized in that it contains methyl-4-isothiazolin-3-one in the range of 0 to 2 wt. %, in relation to the total proportion of 5-chloro-2-methyl-4-isothiazolin-3-one.

A biocidal composition containing solely 5-chloro-2-methylisothiazolin-3-one with a content of methyl-4-isothiazolin-3-one in the range of 0 to 2 wt. %, in relation to the total proportion of 5-chloro-2-methyl-4-isothiazolin-3-one, and at least one further component selected from the group of 1,2-benzisothiazolin-3-one, 2-bromo-2-nitropropane-1,3-diol and zinc in the respectively indicated weight ratios without the presence of a further component shall be called the "biocidal composition according to the invention" in the context of the present invention.

A "biocidal composition according to the invention" may comprise in addition one or more further ingredients besides the 5-chloro-2-methylisothiazolin-3-one with a content of methyl-4-isothiazolin-3-one in the range of 0 to 2 wt. %, in relation to the total proportion of 5-chloro-2-methyl-4-isothiazolin-3-one, and the at least one further component, selected from the group of 1,2-benzisothiazolin-3-one, 2-bromo-2-nitropropane-1,3-diol and zinc.

The further ingredient or ingredients may have a microbicidal effect, or they may have no microbicidal effect, i.e., they may be a solvent, dispersing agent, or suspension agent.

It is advantageous for the biocidal composition according to the invention to contain the 5-chloro-2-methylisothiazolin-3-one with a content of methyl-4-isothiazolin-3-one in the range of 0 to 2 wt. %, in relation to the total proportion of 5-chloro-2-methyl-4-isothiazolin-3-one, and the at least one further component, selected from the group of 1,2-benzisothiazolin-3-one, 2-bromo-2-nitropropane-1,3-diol and zinc in a total concentration of 0.5 to 50 wt. %, preferably 1 to 20 wt. %, especially preferred 2.5 to 10 wt. %, in relation to the overall biocidal composition, respectively.

In another embodiment, the biocidal composition according to the invention consists predominantly of 5-chloro-2-methylisothiazolin-3-one with a content of methyl-4-isothiazolin-3-one in the range of 0 to 2 wt. %, in relation to the total proportion of 5-chloro-2-methyl-4-isothiazolin-3-one, and at least one further component, selected from the group of 1,2-benzisothiazolin-3-one, 2-bromo-2-nitropropane-1,3-diol and zinc (i.e., the biocidal composition or the biocide mixture according to the invention). This means that the biocidal composition according to the invention contains, as the principal ingredient, the biocide mixture according to the invention, preferably in a quantity equal to or greater than 50 wt. %, more preferably in a quantity equal to or greater than 70 wt. %, especially in a quantity equal to or greater than 90 wt. %, especially in a quantity equal to or greater than 95 wt. %, in relation to the total weight of biocidal active substance. In addition, at least one further biocide may be present, as well as one or more solvents, dispersing agents, or suspension agents.

According to another embodiment of the invention, the biocidal composition according to the invention consists substantially of the biocide mixture according to the invention, i.e., besides the mixture, there may also be contained several other biocides, but these are present in such amounts that there is no contribution of the respective biocide different from the components of the mixture to the overall effect of the resulting mixture. Thus, if the biocidal effect of a biocidal composition according to the invention having—besides the components of the biocide mixture according to the invention as principal ingredient—also one or more other biocides in subordinate or lesser concentration, is not changed as compared to the use of the biocide mixture according to the invention, this is termed "consisting substantially" in the context of the present invention. One or more other ingredients without a biocidal effect may be present, such as solvents.

In another embodiment, the biocidal composition according to the invention may consist of the components of the biocide mixture according to the invention as the sole biocidal active substances, i.e., a content of active substances of 100% 5-chloro-2-methylisothiazolin-3-one with a content of methyl-4-isothiazolin-3-one in the range of 0 to 2 wt. %, in relation to the total proportion of 5-chloro-2-methyl-4-isothiazolin-3-one, and at least one further component, selected from the group of 1,2-benzisothiazolin-3-one, 2-bromo-2-nitropropane-1,3-diol and zinc. In such a case, it is only possible for one or more further ingredients with no biocidal effect to be present, such as solvents or stabilizers.

According to another embodiment of the invention, the biocidal composition according to the invention is present as a concentrate, which is added to the substances or products being preserved with it. The concentrate advantageously comprises 5-chloro-2-methylisothiazolin-3-one in a quantity of 0.5 to 50 wt. %, preferably in a quantity of 0.5 to 20 wt. %, especially preferred in a quantity of 0.7 to 10 wt. %, in relation to the total weight of the concentrate. The quantity of the at least one further compound selected from the group of 1,2-benzisothiazolin-3-one, 2-bromo-2-nitropropane-1,3-diol and zinc in the concentrate generally amounts to 0.5 to 50 wt. %, preferably 1 to 20 wt. %, especially preferred 1 to 5 wt. %, in relation to the total weight of the concentrate.

In one advantageous embodiment, the biocidal composition is present in the form of a liquid preparation, such as a solution, a suspension or a dispersion in a liquid medium. Of course, the biocidal composition according to the invention may also be mixed directly in a product being preserved. This is done by adding the individual microbicidally active components to the product being preserved.

It is expedient for the biocidal composition according to the invention to be present for application in combination with a polar or nonpolar liquid medium.

Preferred polar liquid media are water, aliphatic alcohols with 1 to 4 carbon atoms, such as ethanol and isopropanol, a glycol, such as ethylene glycol, diethylene glycol, 1,2-propylene glycol, dipropylene glycol and tripropylene glycol, a glycol ether, such as butylglycol and butyldiglycol, a glycol ester, such as butylglycol acetate or 2,2,4-trimethylpentane diol monoisobutyrate, a polyethylene glycol, a propylene glycol, N,N-dimethylformamide, or a mixture of two or more of such media. The polar liquid medium is in particular water and/or glycol.

Aromatics may be used as nonpolar liquid media, preferably xylene and toluene. These may also be used alone or as mixtures of two or more such media.

The biocidal composition according to the invention may be also combined at the same time with a polar or a nonpolar liquid medium.

It is generally possible to adapt the biocidal composition according to the invention to special areas of application by the adding of further active substances, for example in regard to a heightened effect or improved compatibility with the substances being protected against microorganisms. These further substances are known to the person skilled in the field of biocides and may be employed by them depending on the application for the biocidal composition according to the invention.

The biocidal composition according to the invention may be used for preservation in many diverse fields. Preferably, the preparation according to the invention is used for canning preservation, preferably for the preservation of coating materials such as paints, varnishes and plaster, of polymer dispersions, emulsions, slurries, pigment preparations, laundry detergent and cleaning products, and adhesives.

The invention furthermore also relates to products which contain the biocidal composition according to the invention. These products are generally selected from among lignin sulfonates and starch preparations in coating materials, paints, varnishes, glazes and plasters, emulsions, latexes, polymer dispersions, chalk slurries, mineral slurries, ceramics, adhesives, fragrances, casein-containing products, starch-containing products, bitumen emulsions, surfactant solutions, fuels, detergents, pigment pastes and pigment dispersions, inks, lithographic liquids, thickeners, cosmetic products, toilet articles, water systems, fluids in wood working, fluids in oil extraction, fluids in paper processing, fluids in leather production, fluids in textile production, drilling and cutting oils, hydraulic fluids and coolants.

In the practical application, the biocidal composition may be applied either as a ready mixture or by separate adding of the individual components of the composition to the product being preserved.

The content of the components in the preservation application (the application concentration) may vary in a broad range depending on the purpose of the application and it is usually established by the person skilled in the field of biocides. The following indicated concentration ranges will provide the skilled person with an indication of the concentrations to be used.

In the product preserved with the composition according to the invention, the at least one component is selected from the group of 1,2-benzisothiazolin-3-one, 2-bromo-2-nitropropane-1,3-diol and zinc.

The content of the components in the preservation application (the application concentration) may vary in a broad range depending on the purpose of the application and it is usually established by the person skilled in the field of biocides. The following indicated concentration ranges will provide the skilled person with an indication of the concentrations to be used.

In the product preserved with the biocidal composition according to the invention, the chloro-2-methylisothiazolin-3-one is contained generally in a quantity in the range of 1 to 500 ppm, preferably in a quantity of 5 to 200 ppm, preferably in a quantity of 10 to 100 ppm, especially preferred in a quantity of 10 to 30 ppm.

In the product preserved with the composition according to the invention, the at least one component is selected from the group of 1,2-benzisothiazolin-3-one, 2-bromo-2-nitropropane-1,3-diol and zinc.

In the presence of 1,2-benzisothiazolin-3-one as the further component, this is contained in the product being preserved with the composition according to the invention in general in a quantity in the range of 1 to 1000 ppm, preferably in a quantity of 5 to 750 ppm, preferably in a quantity of 10 to 500 ppm, especially preferred in a quantity of 25 to 250 ppm.

In the presence of 2-bromo-2-nitropropane-1,3-diol as the further component, this is contained in the product being preserved with the composition according to the invention in general in a quantity in the range of 1 to 2000 ppm, preferably in a quantity of 5 to 1000 ppm, preferably in a quantity of 10 to 500 ppm, especially preferred in a quantity of 20 to 250 ppm.

In the presence of zinc as the further component, this is contained in the product being preserved with the composition according to the invention in general in a quantity in the range of 10 to 5000 ppm, preferably in a quantity of 25 to 2500 ppm, preferably in a quantity of 50 to 1000 ppm, especially preferred in a quantity of 100 to 500 ppm.

The following examples will serve for further illustration of the present invention.

Investigation of the Synergistic Effect

The synergism of a combination of 5-chloro-2-methyl-isothiazolin-3-one, containing 0.003 wt. %, in relation to the total proportion of 5-chloro-2-methyl-4-isothiazolin-3-one, of 2-methylisothiazolin-3-one, each time with a biocide/substance selected from the group of 1,2-benzisothiazolin-3-one (BIT), 2-bromo-2-nitropropane-1,3-diol (Bronopol), and zinc, was investigated for a synergistic interaction.

The test organisms used were the Gram-negative bacterium *Pseudomonas putida* (DSM 25068). For this, mixtures with different concentrations of the respective active substances were prepared and tested in regard to their effect on *Pseudomonas putida*. The testing was done in Müller-Hinton broth MHB (pH 7.0) with a cell density of $10^6$ germs per ml.

The incubation time of the microtiter plates was 48 hours at 30° C. After 48 hours, the batches were evaluated for turbidity due to growth and, in addition, the optical density was determined by photometry. In this way, the minimum inhibitory concentrations (MHK) were determined for the two active substances individually and in combination.

The resulting synergism was represented numerically by calculating the synergy index (SI). The calculation was done by the customary method of F. C. Kull et al., Applied Microbiology, Vol. 9 (1961), p. 538. Loc. cit., the SI is calculated by the following formula:

$$\text{synergy index } SI = Q_a/Q_A + Q_b/Q_B$$

$Q_a$=concentration of component A in the mixture A+B
$Q_A$=concentration of component A as solitary biocide
$Q_b$=concentration of component B in the mixture A+B
$Q_B$=concentration of component B as solitary biocide If the synergy index has a value over 1, this means that an antagonism is present. If the synergy index takes on the value 1, this means that an addition of the effect of the two biocides/compounds is present. If the synergy index takes on a value below 1, this means that a synergism exists for the two biocides.

If the synergy index has a value over 1, this means that an antagonism is present.

EXAMPLE 1

Investigation of the Synergistic Interaction Between chloro-2-methyl-4-isothiazolin-3-one (CMIT) and 1,2-benzisothiazolin-3-one (BIT)

Calculation of the synergy index of chloro-2-methyl-4-isothiazolin-3-one (CMIT) and 1,2-benzisothiazolin-3-one (BIT) with regard to *Pseudomonas putida* at an incubation time of 48 hours at 30° C.

TABLE 1

| Qa (CMIT) [ppm] | Qb (BIT) [ppm] | synergy index |
|---|---|---|
| 0 | 100 | 1.00 |
| 0.25 | 75 | 0.92 |
| 0.5 | 50 | 0.83 |
| 0.5 | 40 | 0.73 |
| 0.75 | 30 | 0.80 |
| 0.75 | 20 | 0.70 |
| 1 | 10 | 0.77 |
| 1 | 5 | 0.72 |
| 1.5 | 0 | 1.00 |

Qa: concentration of CIT in the mixture indicating an end point
QA: concentration of CIT as solitary agent indicating an end point
Qb: concentration of BIT in the mixture indicating an end point
QB: concentration of BIT as solitary agent indicating an end point It is evident from Table 2 that the optimal synergism, i.e., the lowest synergy index (0.69) of a biocidal composition of CMIT and BIT lies at a ratio of 1 ppm of CMIT to 2.5 ppm of BIT. A synergism can be demonstrated if the weight ratio of the biocides CMIT and BIT lies in the range of 1:2.5 to 1:300.

EXAMPLE 2

Investigation of the Synergistic Interaction Between chloro-2-methyl-4-isothiazolin-3-one (CMIT) and 2-bromo-2-nitropropane-1,3-diol (Bronopol)

Calculation of the synergy index of chloro-2-methyl-4-isothiazolin-3-one (CMIT) and 2-bromo-2-nitropropane-1,3-diol (Bronopol) with regard to *Pseudomonas putida* at an incubation time of 48 hours at 30° C.

TABLE 2

| Qa (CMIT) [ppm] | Qb (Bronopol) [ppm] | synergy index |
|---|---|---|
| 0 | 15 | 1.00 |
| 0.25 | 10 | 0.83 |
| 0.25 | 7.5 | 0.67 |
| 0.25 | 5 | 0.50 |
| 0.5 | 4 | 0.60 |
| 0.75 | 2 | 0.63 |
| 1 | 2 | 0.80 |
| 1.5 | 0 | 1.00 |

Qa: concentration of CIT in the mixture indicating an end point
QA: concentration of CIT as solitary agent indicating an end point
Qb: concentration of Bronopol in the mixture indicating an end point
QB: concentration of Bronopol as solitary agent indicating an end point It is evident from Table 2 that the optimal synergism, i.e., the lowest synergy index (0.50) of a biocidal composition of CMIT and Bronopol lies at a ratio of 0.25 ppm of CMIT to 5 ppm of Bronopol. A synergism can be demonstrated if the weight ratio of the biocides CMIT and Bronopol lies in the range of 1:2 to 1:40.

EXAMPLE 3

Investigation of the Synergistic Interaction Between chloro-2-methyl-4-isothiazolin-3-one (CMIT) and zinc Calculation of the synergy index of chloro-2-methyl-4-isothiazolin-3-one (CMIT) and zinc (added as zinc chloride, $ZnCl_2$) with regard to *Pseudomonas putida* at an incubation time of 48 hours at 30° C.

TABLE 3

| Qa (CMIT) [ppm] | Qb (Zn) [ppm] | synergy index |
|---|---|---|
| 0 | 240* | 1.00 |
| 0.25 | 144 | 0.77 |
| 0.5 | 96 | 0.73 |
| 0.5 | 72 | 0.63 |
| 0.75 | 36 | 0.65 |
| 1 | 6 | 0.69 |
| 1.5 | 0 | 1.00 |

*End point >240 ppm, assuming 240 ppm as the end point for the calculation

Qa: concentration of CIT in the mixture indicating an end point
QA: concentration of CIT as solitary agent indicating an end point
Qb: concentration of Zn in the mixture indicating an end point
QB: concentration of Zn as solitary agent indicating an end point It is evident from Table 3 that the optimal synergism, i.e., the lowest synergy index (0.63) of a biocidal composition of CMIT and $ZnCl_2$ lies at a ratio of 0.5 ppm of CMIT to 72 ppm of zinc. A synergism can be demonstrated if the weight ratio of the components CMIT and zinc lies in the range of 1:6 to 1:576.

The invention claimed is:

1. A biocidal composition containing 5-chloro-2-methyl-isothiazolin-3-one and 1,2-benzisothiazolin-3-one-characterized in that the composition contains methyl-4-isothiazolin-3-one in the range of 0 to 2 wt. % in relation to the total proportion of 5-chloro-2-methylisothiazolin-3-one, and characterized in that the weight ratio of 5-chloro-2-methylisothiazolin-3-one to 1,2-benzisothiazolin-3-one is in the range of from 1:2.5 to 1:300.

2. The biocidal composition as claimed in claim 1, characterized in that it contains a polar and/or a nonpolar medium.

3. The biocidal composition as claimed in claim 2, characterized in that it contains, as the polar liquid medium, water, an aliphatic alcohol with 1 to 4 carbon atoms, a glycol, a glycol ether, a glycol ester, a polyethylene glycol, a propylene glycol, N,N-dimethylformamide, 2,2,4-trimethylpentane diol monoisobutyrate or a mixture of these.

4. The biocidal composition as claimed in claim 1, characterized in that it is present as a liquid preparation.

5. A preserved product containing the biocidal composition as claimed in claim 1.

6. The preserved product as claimed in claim 5, selected from lignin sulfonates and starch preparations in coating materials, paints, varnishes, glazes and plasters, emulsions, latexes, polymer dispersions, chalk slurries, mineral slurries, ceramics, adhesives, fragrances, casein-containing products, starch-containing products, bitumen emulsions, surfactant solutions, fuels, detergents, pigment pastes and pigment dispersions, inks, lithographic liquids, thickeners, cosmetic products, toilet articles, water systems, fluids in wood working, fluids in oil extraction, fluids in paper processing, fluids in leather production, fluids in textile production, drilling and cutting oils, hydraulic fluids and coolants.

7. The biocidal composition as claimed in claim 1, characterized in that the weight ratio of 5-chloro-2-methylisothiazolin-3-one to 1,2-benzisothiazolin-3-one is in the range of 1:2.5 to 1:100.

8. The biocidal composition as claimed in claim 1, characterized in that the weight ratio of 5-chloro-2-methylisothiazolin-3-one to 1,2-benzisothiazolin-3-one is in the range of 1:2.5 to 1:50.

9. A method of canning preservation, comprising applying the biocidal composition as claimed in claim 1 to a product being preserved.

10. The method as claimed in claim 9, wherein the product being preserved is coating materials selected from the group consisting of paints, varnishes and plaster, of polymer dispersions, emulsions, latexes and adhesives.

\* \* \* \* \*